United States Patent [19]

Clark et al.

[11] Patent Number: 4,512,206

[45] Date of Patent: Apr. 23, 1985

[54] ACTUATING DEVICE FOR ROTATING SHAFTS

[75] Inventors: James A. Clark, Honeoye Falls; Alfred P. Gabriel, Rochester, both of N.Y.

[73] Assignee: Bausch & Lomb Incorporated, Rochester, N.Y.

[21] Appl. No.: 497,469

[22] Filed: May 23, 1983

[51] Int. Cl.$^3$ ............................................. F16H 35/18
[52] U.S. Cl. ............................. 74/10.54; 74/471 R; 74/479; 192/48.91; 350/530
[58] Field of Search .................... 74/10.5, 10.54, 10.52, 74/479, 553, 471 R; 350/521, 530; 192/48.91

[56] References Cited

U.S. PATENT DOCUMENTS

| 2,148,576 | 2/1939 | Ott | 350/521 |
|---|---|---|---|
| 2,403,208 | 7/1946 | Bechler | 192/48.91 |
| 2,645,972 | 7/1953 | Aitcheson | 74/479 X |
| 2,869,373 | 1/1959 | Erbe et al. | 74/10.52 |
| 3,292,440 | 12/1966 | Karr et al. | 74/10.5 |
| 3,307,414 | 3/1967 | Naber et al. | 74/10.54 X |
| 3,385,116 | 5/1968 | Carlson et al. | 74/10.54 |
| 3,688,885 | 9/1972 | Cummings | 192/48.91 |
| 4,173,902 | 11/1979 | Shio | 74/10.52 |
| 4,445,758 | 5/1984 | Emmel | 350/530 |

FOREIGN PATENT DOCUMENTS

| 0787105 | 9/1935 | France | 350/521 |
|---|---|---|---|
| 0843299 | 8/1960 | United Kingdom | 74/553 |

Primary Examiner—Allan D. Herrmann
Assistant Examiner—Shirish Desai
Attorney, Agent, or Firm—John S. Norton

[57] ABSTRACT

An actuating mechanism is rotatably and pivotably mounted to a rotatable adjusting mechanism of an instrument. The rotatable mechanism includes a bearing surface and a friction surface. The actuating mechanism includes a pivot and friction means. By pivoting the actuating mechanism about the pivot against the bearing surface, the friction means engages the friction surface. The actuating mechanism and adjusting mechanism are thereby locked together and can be rotated in unison. The rotatable mechanism may include a second bearing surface and a second friction surface and the actuating mechanism may include a second pivot and a second friction means. The second bearing surface and the second pivot are adjacent each other, as are the second friction surface and the second friction means. Pivoting the actuating mechanism in a second direction will engage the second pivot to the second bearing surface and the second friction means to the second friction surface. The second friction means and the second friction surface may thereby be rotated in unison.

11 Claims, 5 Drawing Figures

ACTUATING DEVICE FOR ROTATING SHAFTS

BACKGROUND OF THE INVENTION

1. Field of the Invention

The present invention is directed in general to mechanical movements, and more particularly to an actuating mechanism adapted for use in association with rotatably mounted adjusting shafts such as are employed in, for instance, optical instruments.

2. Prior Art

There are numerous types of adjusting mechanisms used in optical instruments which vary from a single shaft and knob assembly to coaxially mounted multi-shaft and knob assemblies. The single shaft and knob assemblies are generally used on inexpensive instruments, whereas the coaxially mounted assemblies are found on more sophisticated and expensive instruments. The single shaft and knob only permits adjustment which is directly proportional to the amount of rotation. The multi-shaft coaxial assembly allows for a coarse adjustment and a fine adjustment. In some instances, such as may be seen in U.S. Pat. No. 4,173,902, a further knob may be incoporated which would provide an adjustment which is intermediate to the available coarse and fine adjustments.

In systems such as these however, it is necessary that the operator first rotate one knob and then move the hand from that knob to a second knob. Quite frequently, the adjusting knobs are situated on the instrument in a location which is less than ideal from the standpoint of operator comfort and accessability. For instance, viewing aerial photography at high magnification require frequent focus adjustments. Accordingly, the operator must continually move his or her hand back and forth from a rest surface to the focus adjust knobs. This can be quite annoying, and in some instances of prolonged useage, very tiring.

In an attempt to alleviate this type of difficulty some instrument makers resorted to mounting a lever to at least one of the focus knobs, such as is seen in previously mentioned U.S. Pat. No. 4,173,902. The lever extends from the knob generally toward the operator so that it may easily be grasped and rotated. However, in applications such as these the lever also rotates when the knob is rotated and therefore becomes obtrusive.

A further example of a microscope monoaxial coarse/fine mechanism which features an adjusting lever may be seen in U.S. Ser. No. 385,734, entitled "A Microscope Fine Focus Control Mechanism" and filed on June 7, 1982 by inventor J. A. Clark, co-applicant of the instant invention. In this device, the lever is affixed to a hub which is mounted via a tapered bushing to the coarse shaft. The tapered bushing is eccentrically mounted to the instrument. The hub and lever remain stationary when the coarse shaft is rotated. However, rotating the lever induces the hub to also rotate. As the hub is eccentric, rotation of it will cause the coarse shaft to be vertically offset which in turn translates to a vertical adjustment of the microscope objective.

SUMMARY OF THE INVENTION

The present invention is directed toward an adjusting mechanism wherein an actuator is rotatably and pivotally supported relative to a rotatable mechanism which includes bearing and friction surfaces. The actuator includes at least one pivot and friction means. Pivoting the actuator engages the pivot means to the bearing surface and the friction means to the friction surface thereby coupling the rotatable mechanism to the actuator whereby they may be rotated in unison. The actuator maintains a neutral and unobtrusive position when not being directly rotated.

The actuator may be incorporated in instruments which utilize monoaxial coarse/fine adjusting shafts such as, are found in laboratory and clinical microscopes. The actuator would be positioned between the coarse knob and the fine knob and depending on the direction in which the actuator is pivoted and rotated either coarse or fine adjustments may be accomplished.

DESCRIPTION OF THE PREFERRED EMBODIMENT

Figure 1:
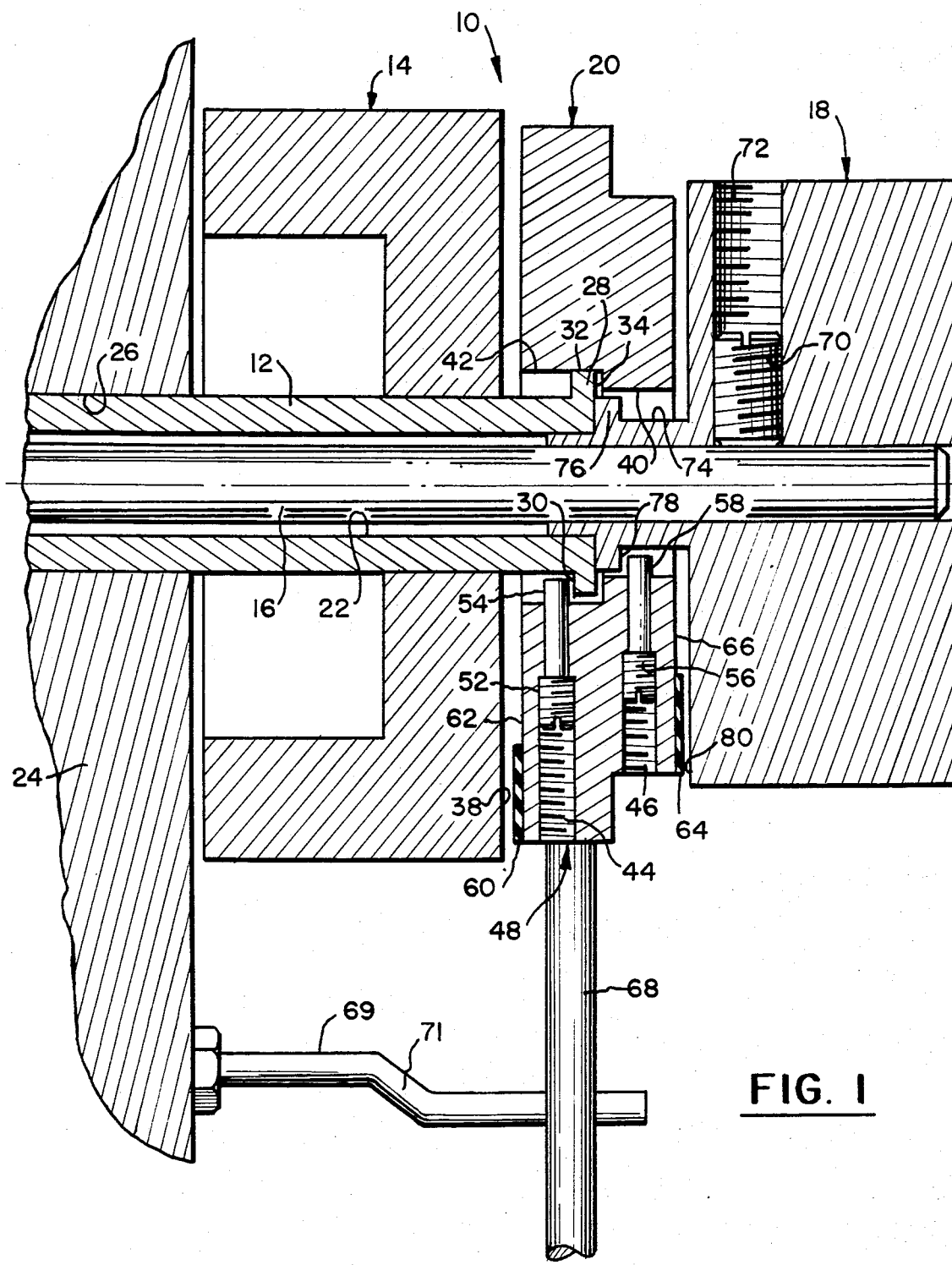
FIG. 1 is a sectional view of monoaxial coarse-fine adjusting apparatus showing the actuating mechanism in a neutral position.

In the preferred embodiment, a monoaxial actuating mechanism 10 comprises a coarse/fine focus mechanism for an optical instrument, such as a microscope. The actuating mechanism 10 includes a coarse adjusting shaft 12 and knob 14, a fine adjusting shaft 16 and knob 18 and an auxilliary actuator 20 mounted between the coarse knob 14 and the fine knob 18.

The coarse shaft 12 has a longitudinal bore 22 and is rotatably mounted to support structure 24 via bearing aperture 26. A flange 28 comprising a bearing wall 30 and a cylindrical support surface 32 is formed on coarse shaft 12 at end 34 thereof. The coarse knob 14, which is secured in any convenient manner to the coarse shaft 12, includes a friction surface 38.

The actuator 20 includes first and second bores 40, 42. Bore 42 is slightly larger than the diameter of cylindrical support surface 32 of coarse shaft 12 on which it is loosely mounted. The actuator 20 also includes a pair of shouldered threaded apertures 44 and 46. Aperture 44 extends from the stepped outer periphery 48 to the bore 42 while aperture 46 extends to the bore 40. A shouldered screw pin 52 is seated in aperture 44 so that a portion of its shank 54 extends into bore 42. Similarly, shouldered screw pin 56 is seated in aperture 46 and has shank portion 58 extending into bore 40. A first friction pad 60 constructed from, for instance, silicone rubber, is affixed to surface 62 of actuator 20. A second friction pad 64 is affixed to surface 66. A lever 68 is detachably mounted, such as by threads not shown, to actuator 20 and extends from periphery 48 thereof.

Figure 4:
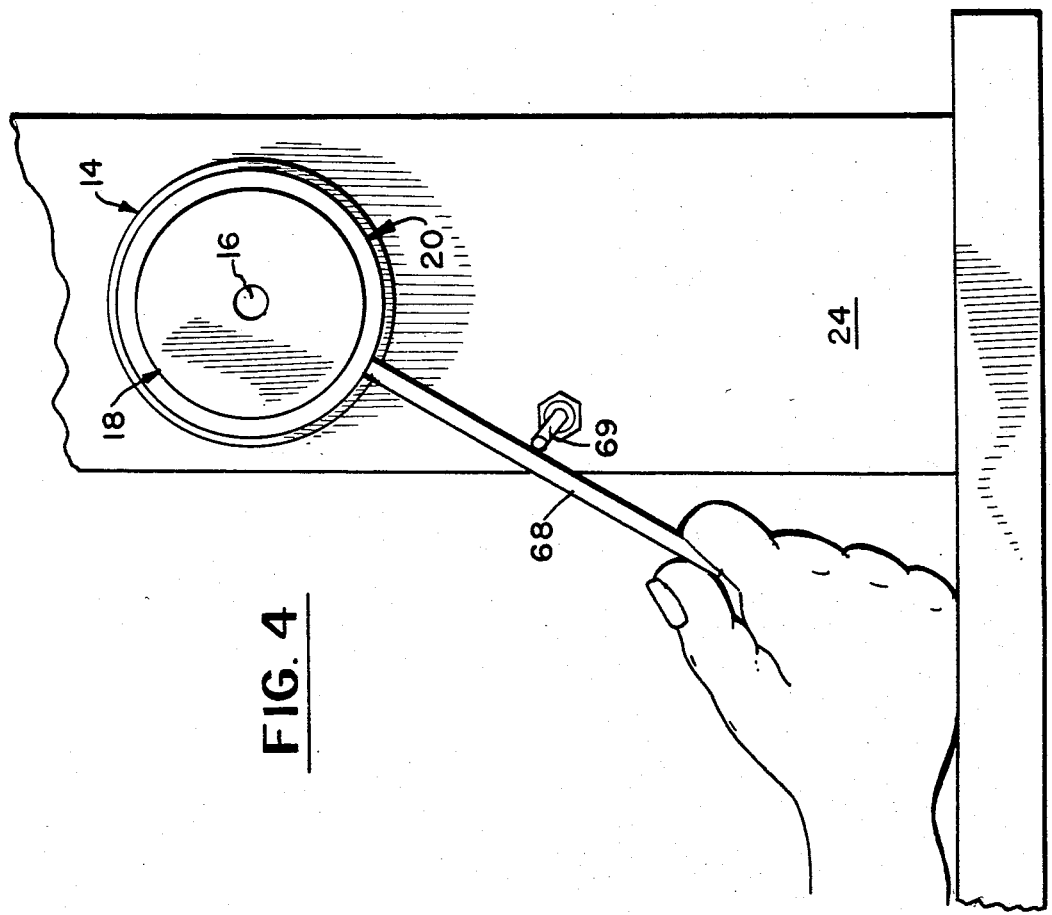
FIG. 4 is a side view of the actuating mechanism.

Due to the loose fit between the actuator 20 and the support surface 32 of flange 28, as described hereinabove, the lever 68 will act as a pendulum maintaining the actuator in a downward facing position. Alternatively, lever 68 may be mechanically positioned in any other location which is convenient to the operator of the instrument. As is shown in FIGS. 1 and 4, a stop rod 69 is mounted to and protrudes from the instrument housing 24 to position the lever 68. Therefore, as seen in FIG. 4, the lever 68 becomes more accessible to the operator and, accordingly, more easily manipulated. The stop rod 69 may include an offset 71 which, by rotating the rod, would enable the operator to vary the position of the lever 68. This mechanism accommodates for variations in human anatomy such as length of arm and size of hand and would allow the operator to select the position of the lever 68 which is most comfortable.

The fine focus shaft 16 is coaxially mounted through bore 22 of coarse shaft 12 and has knob 18 secured thereto by, for instance, set screw 70 which is received in threaded hole 72. Knob 18 includes a hub 74 which has a flange 76 defining a bearing surface 78. Knob 18 also includes a friction surface 80.

Figure 2:
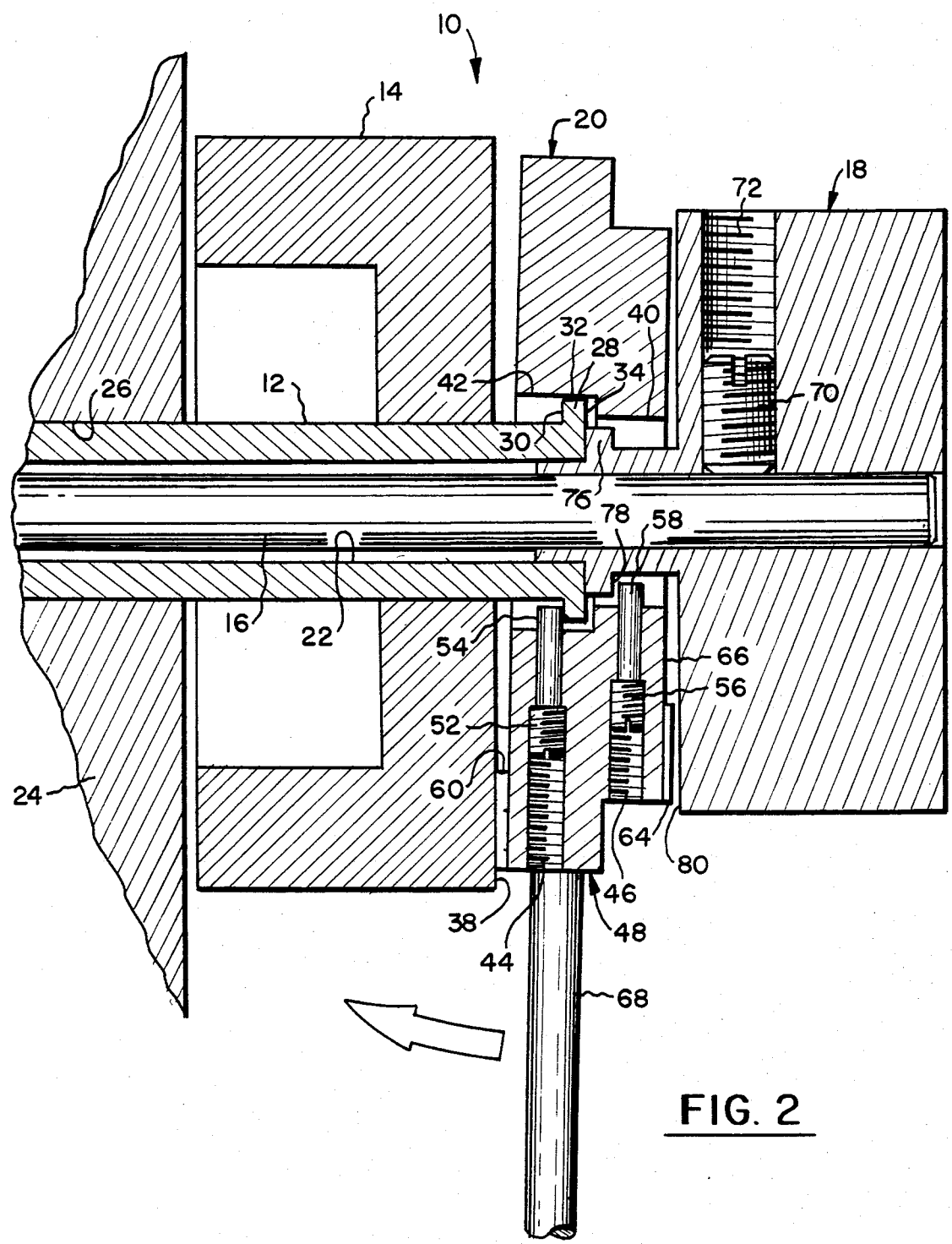
FIG. 2 is a sectional view similar to FIG. 1 showing the actuating mechanism in position for coarse adjustments.
Figure 3:
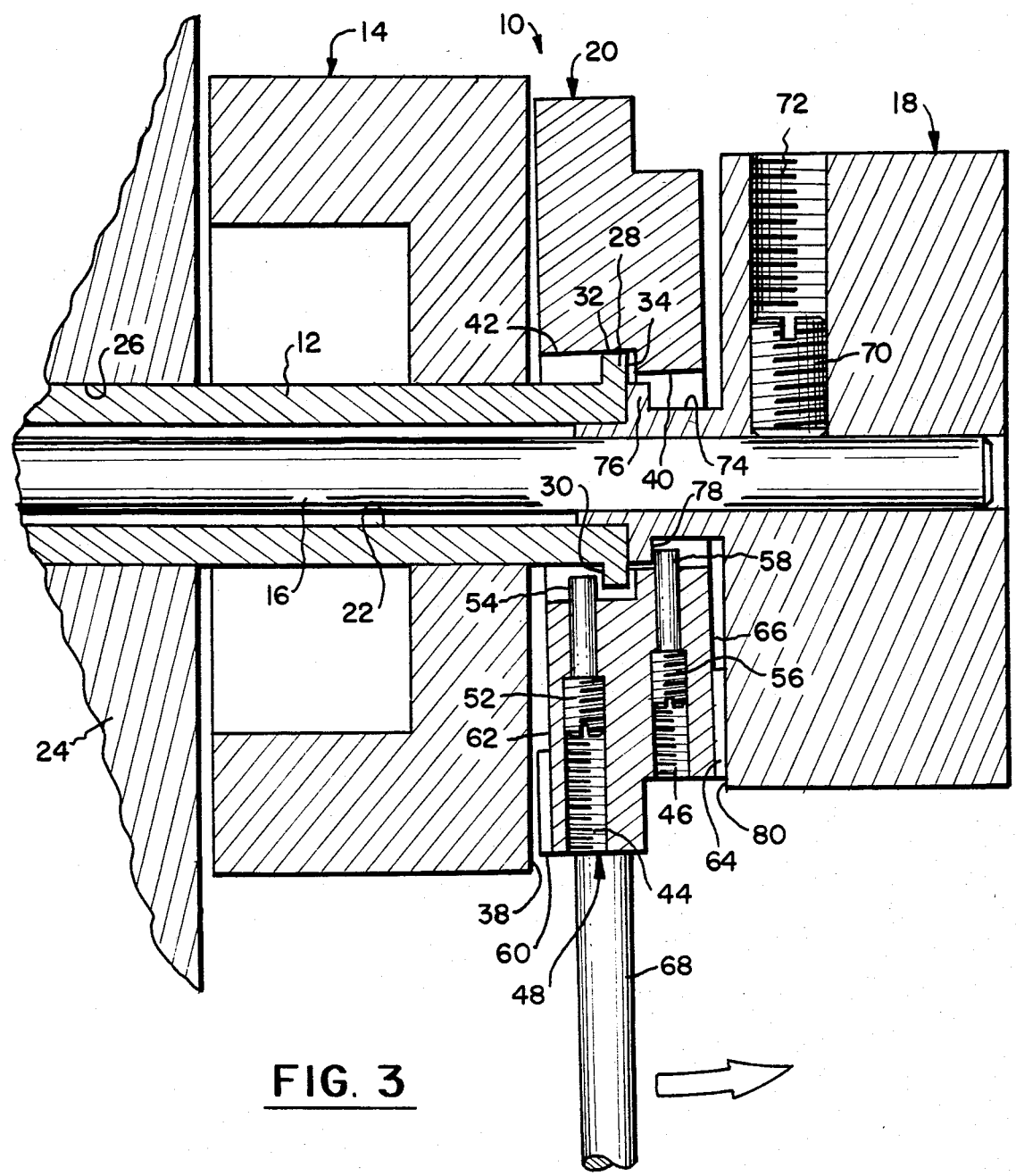
FIG. 3 is a sectional view showing the actuating mechanism in position for fine adjustments.

In operation, the instrument would normally be focused in the conventional manner, i.e.; the coarse knob 14 would initially be rotated for coarse adjustment; the fine knob 18 would then be rotated for fine focusing. As previously described, the gravitational force exerted on actuator 20 by lever 68 is such that the actuator 20 remains stationary and will not rotate when either the coarse knob 14 or fine knob 18 is rotated. However, the actuator 20 may be pivoted and rotated, as seen in FIGS. 2 and 3, to change the focus of the instrument should the need arise after initial focusing. By pivoting the lever 68 toward the coarse knob 14, as best seen in FIG. 2, friction pad 60 of actuator 20 engages the friction surface 38 and shank 54 of screw pin 52 is urged against bearing wall 30. With actuator 20 thus coupled to the coarse knob 14, rotating the lever 68 also rotates the actuator 20, knob 14 and shaft 12.

Similarly, to change fine focus, the actuating lever 68 is pivoted about support surface 32 of flange 28 toward the fine knob 18, as best seen in FIG. 3. Friction pad 64 engages friction surface 80 and screw pin shank 58 engages bearing wall 78 of fine knob flange 76. Actuator 20 is thereby locked to fine shaft 16 and knob 18. Thus coupled, rotation of the lever 68 produces a similar rotation of the fine knob 16 and shaft 18.

The amount of rotation produced whether, of coarse shaft 12 or fine shaft 16, is proportional to the length of the lever 68. It will be appreciated that by varying the length of the actuator lever 68, the preciseness of the adjustment will also vary. For a given arc, increasing the length of the lever 68 also increases the distance the free end of the lever must move. Conversely, as the lever 68 is shortened, the distance the free end moves is similarly lessened and, therefore, the adjustment becomes less precise. The lever 68, in any case, should be of an appropriate length and in an appropriate position to allow the operator ready access to it without undue hand or arm movement.

Figure 5:
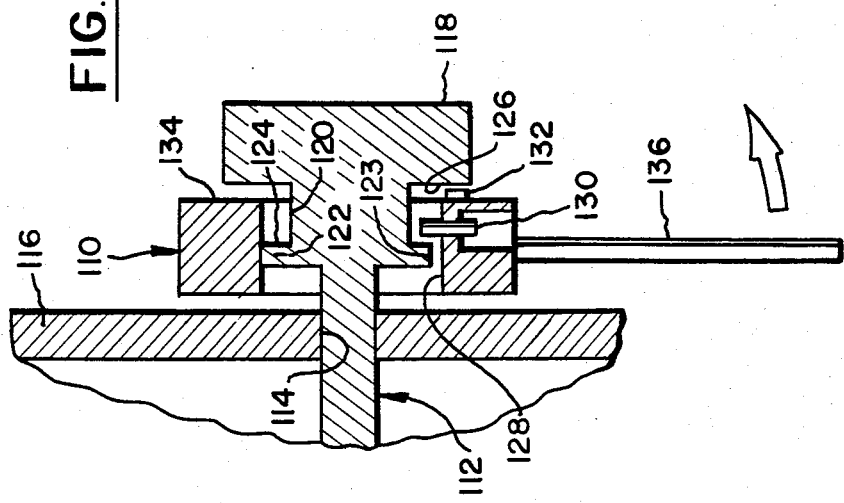
FIG. 5 is a sectional view of another embodiment of the actuating device.

Another embodiment of the actuating mechanism is shown in FIG. 5, wherein the actuating mechanism 110 is mounted to a single adjusting shaft 112 which is rotatably supported in bore 114 of instrument housing 116. The shaft 112 includes a handwheel portion 118 and a hub 120 with a flange 122 defining a support surface 123 and a bearing surface 124 thereon. The handwheel portion 118 further includes a friction surface 126.

The actuating mechanism 110 has a bore 128 which is slightly larger than the corresponding diameter of flange 122. The actuating mechanism 110 is received on and supported by at least a portion of support surface 123 of flange 122. The actuating mechanism 110 also includes a pivot member 130 which is affixed thereto such that it protrudes into bore 128 adjacent to the bearing surface 124. A pad of friction material 132 is affixed to surface 134 of actuator 110 in juxtaposition to friction surface 126 of handwheel portion 118. An actuating lever 136 may be affixed to the actuator in any convenient manner. The operation of this single shaft embodiment is essentially the same as in the above-described multi-shaft embodiment.

It will be appreciated that although we have shown and described our invention in preferred forms, many changes may be made thereto without departing from the spirit or scope of the invention, as set forth in the appended claims.

It is claimed:

1. An adjusting mechanism comprising:
   (a) rotatable means, said rotatable means including a bearing surface and a friction surface, and
   (b) actuator means including pivot means and friction means, said actuator means being rotatably and pivotably supported relative to said rotatable means with said pivot means adjacent said bearing surface and said friction means adjacent said friction surface, whereby when said actuator means is pivoted in a first direction said pivot means engages said bearing surface and said friction means engages said friction surface, whereby said actuator means and said rotatable means may be rotated in unison.

2. The adjusting mechanism as set forth in claim 1, wherein said bearing surface is spaced from said friction surface, and said pivot means and said friction means are positioned between said surfaces.

3. The adjusting mechanism as set forth in claim 2, wherein said rotatable means includes a knob and a flange, said friction surface being located on said knob and said bearing surface on said flange.

4. The adjusting mechanism as set forth in claim 3, wherein said actuator means includes a bore, and wherein said flange is circular and is received in said bore to support said actuator means.

5. The adjusting mechanism as set forth in claim 4, wherein said pivot means protrudes into said bore of said actuator means.

6. The adjusting mechanism as set forth in claim 4, further including a lever mounted to said actuator means.

7. The adjusting mechanism as set forth in claim 1, wherein said rotatable means includes a second bearing surface and a second friction surface, and wherein said actuator means includes a second pivot means and a second friction means, said second pivot means being adjacent to said second bearing surface and said second friction means being adjacent said second friction surface, whereby when said actuating means is pivoted in a second direction, said second pivot engages said second bearing surface and said second friction means engages said second friction surface, whereby said second friction means and said second friction surface may be rotated in unison.

8. The adjusting mechanism as set forth in claim 7, wherein said rotatable means includes first and second relatively rotatable members, said bearing surface and said friction surface being on said first rotatable member, said second bearing surface and said second friction surface being on said second rotatable member.

9. The adjusting mechanism as set forth in claim 8, wherein said friction surface is spaced from said second friction surface, and said bearing surface, second bearing surface, pivot, second pivot, friction means and second friction means are positioned between said friction surfaces.

10. The adjusting mechanism as set forth in claim 9, wherein said first rotatable member includes a first knob and a first flange, said friction surface being on said first knob, said bearing surface on said first flange, and said second rotatable member includes a second knob and a second flange, said second friction surface being on said second knob, said second bearing surface being on said second flange.

11. The adjusting mechanism as set forth in claim 10, wherein said actuator means is a ring shaped member positioned between said knobs, said ring shaped member having a bore which is received over said flanges and supported by at least one of said flanges.

* * * * *